(12) United States Patent
Zhang et al.

(10) Patent No.: US 12,738,599 B2
(45) **Date of Patent: *Sep. 15, 2026**

(54) MICROPOROUS MEMBRANE SEPARATORS FOR LITHIUM ION RECHARGEABLE BATTERIES AND RELATED METHODS

(71) Applicant: Celgard, LLC, Charlotte, NC (US)

(72) Inventors: Xiaomin Zhang, Charlotte, NC (US); Kang Karen Xiao, Mississauga (CA); Robert A. Nark, Charlotte, NC (US); Ron E. Smith, Huntersville, NC (US)

(73) Assignee: Celgard, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,442

(22) Filed: Aug. 14, 2023

(65) Prior Publication Data

US 2024/0006719 A1 Jan. 4, 2024

Related U.S. Application Data

(62) Division of application No. 14/950,478, filed on Nov. 24, 2015, now Pat. No. 11,728,546.

(Continued)

(51) Int. Cl.

*H01M 2/18* (2006.01)
*H01M 50/406* (2021.01)

(Continued)

(52) U.S. Cl.

CPC ....... *H01M 50/449* (2021.01); *H01M 50/406* (2021.01); *H01M 50/414* (2021.01);

(Continued)

(58) Field of Classification Search

CPC ............ H01M 50/449; H01M 50/454; H01M 50/457; H01M 50/489; H01M 50/414;

(Continued)

(56) References Cited

U.S. PATENT DOCUMENTS

| | | |
|---|---|---|
| 5,051,183 A | 9/1991 | Takita et al. |
| 6,096,213 A | 8/2000 | Radovanovic et al. |

(Continued)

FOREIGN PATENT DOCUMENTS

| | | |
|---|---|---|
| CN | 101000952 A | 7/2007 |
| CN | 101174679 A | 5/2008 |

(Continued)

OTHER PUBLICATIONS

X.M. Zhang et al., "Oriented structure and anisotropy properties of polymer blown films: HOPE, LLOPE and LOPE," Polymer 45, Elsevier Ltd., (p. 217-229), 2004.

(Continued)

*Primary Examiner* — Raymond Alejandro

(74) *Attorney, Agent, or Firm* — J. Clinton Wimbish; Maynard Nexsen PC

(57) ABSTRACT

In at least selected embodiments to novel or improved microporous battery separators for lithium rechargeable batteries and/or related methods of making and/or using such separators are disclosed. A particular inventive dry process battery separator or membrane separator exhibits a thickness that is less than about 14 μm and has increased strength performance as defined by reduced splittiness. The mode of splitting failure has been investigated, and the improvement in splittiness quantified by a novel test method known as the Composite Splittiness Index (CSI).

10 Claims, 9 Drawing Sheets

Related U.S. Application Data

(60) Provisional application No. 62/084,628, filed on Nov. 26, 2014.

(51) Int. Cl.
*H01M 50/414* (2021.01)
*H01M 50/449* (2021.01)
*H01M 50/489* (2021.01)
*H01M 50/491* (2021.01)
*H01M 50/494* (2021.01)
*H01M 10/052* (2010.01)

(52) U.S. Cl.
CPC ....... *H01M 50/489* (2021.01); *H01M 50/491* (2021.01); *H01M 50/494* (2021.01); *H01M 10/052* (2013.01)

(58) Field of Classification Search
CPC ............. H01M 50/406; H01M 50/491; H01M 50/494; H01M 10/052; H01M 10/0525
See application file for complete search history.

(56) References Cited

U.S. PATENT DOCUMENTS

| | | | | |
|---|---|---|---|---|
| 6,153,133 | A | 11/2000 | Kaimai et al. | |
| 6,602,593 | B1 | 8/2003 | Callahan et al. | |
| 6,666,969 | B1 | 12/2003 | Funaoka et al. | |
| 7,488,523 | B1 | 2/2009 | Muncaster et al. | |
| 8,486,556 | B2 * | 7/2013 | Call | H01M 50/491 429/129 |
| 8,795,565 | B2 | 8/2014 | Wei et al. | |
| 9,991,493 | B2 * | 6/2018 | Janakiraman | H01M 4/5835 |
| 10,333,125 | B2 * | 6/2019 | Zhang | H01M 50/489 |
| 11,728,546 | B2 * | 8/2023 | Zhang | H01M 50/406 429/247 |
| 2005/0058821 | A1 | 3/2005 | Smith et al. | |
| 2007/0238017 | A1 | 10/2007 | Call et al. | |
| 2010/0295511 | A1 | 11/2010 | Kikuchi et al. | |
| 2011/0117439 | A1 | 5/2011 | Yamada et al. | |
| 2011/0206973 | A1 | 8/2011 | Brant et al. | |
| 2011/0223486 | A1 | 9/2011 | Zhang et al. | |
| 2012/0064399 | A1 | 3/2012 | Carlson | |
| 2012/0135299 | A1 | 5/2012 | Kwon et al. | |
| 2013/0337311 | A1 * | 12/2013 | Itou | C08J 7/123 264/41 |

FOREIGN PATENT DOCUMENTS

| | | | |
|---|---|---|---|
| CN | 102460776 | A | 5/2012 |
| CN | 102892534 | A | 1/2013 |
| CN | 103201873 | A | 7/2013 |
| CN | 103298866 | A | 9/2013 |
| JP | H10261393 | A | 9/1998 |
| JP | 2007-311332 | A | 11/2007 |
| JP | 2012-011751 | A | 1/2012 |
| JP | 2013-527260 | A | 6/2013 |
| JP | 2014-072165 | A | 4/2014 |
| JP | 2016-022679 | A | 2/2016 |
| JP | 2016-060061 | A | 4/2016 |
| JP | 2021-036531 | A | 3/2021 |
| KR | 10-2012-0116977 | A | 10/2012 |
| KR | 10-2013-0095788 | A | 8/2013 |
| WO | 2012/090632 | A1 | 7/2012 |

OTHER PUBLICATIONS

Seyed H. Tabatabaei et al., "Microporous membranes obtained from PP/HDPE multilayer films by stretching," JMS 345, Elsevier, (p. 148-159), 2009.
First Office Action received for Chinese Patent Application No. 201580074208.0, mailed on Aug. 7, 2019, 13 pages including English translation.
Second Office Action received for Chinese Patent Application No. 201580074208.0, mailed on Jan. 22, 2020, 09 pages including English translation.
First Office Action received for Chinese Patent Application No. 202011108067.0, mailed on Jun. 15, 2020, 16 pages including English translation.
Second Office Action received for Chinese Patent Application No. 202011108067.0, mailed on Dec. 19, 2022, 10 pages including English translation.
Third Office Action received for Chinese Patent Application No. 202011108067.0, mailed on Mar. 14, 2023, 19 pages including English translation.
Rejection Decision received for Chinese Patent Application No. 202011108067.0, mailed on Sep. 1, 2023, 06 pages.
Search report received for Japanese Patent Application No. 2017-527253, mailed on Oct. 23, 2019, 46 pages including English translation.
Office Action received for Japanese Patent Application No. 2017-527253, mailed on Nov. 5, 2019, 15 pages including English translation.
Office Action received for Japanese Patent Application No. 2020-185298, mailed on Feb. 1, 2022, 06 pages including English translation.
Office Action received for Japanese Patent Application No. 2022-167400, mailed on Aug. 8, 2023, 12 pages including English translation.
Office Action received for Japanese Patent Application No. 2022-167400, mailed on Feb. 6, 2024, 04 pages including English translation.
Decision To Grant received for Japanese Patent Application No. 2022-167400, mailed on Jul. 23, 2024, 05 pages including English translation.
Office Action received for Japanese Patent Application No. 2024-137764, mailed on Sep. 2, 2025, 12 pages including English translation.
Written Decision on Registration received for Korean Patent Application No. 10-2023-7038199, mailed on Dec. 27, 2023, 06 pages including English translation.
Office action received for Korean Patent Application No. 10-2017-7017367, mailed on Aug. 26, 2022, 22 pages including English translation.
Final Office action received for Korean Patent Application No. 10-2017-7017367, mailed on Apr. 28, 2023, 09 pages including English translation.
Final Office action received for Korean Patent Application No. 10-2017-7017367, mailed on Aug. 7, 2023, 14 pages including English translation.
International Search Report and Written Opinion received for International Patent Application No. PCT/US2015/062362, mailed on Mar. 31, 2016, 12 pages.
International preliminary report on patentability received for International Patent Application No. PCT/US2015/062362, mailed on Mar. 17, 2017, 14 pages.
Office Action from Korean Intellectual Property Office for KR Application No. 10-2024-7009053 dated Aug. 26, 2025.

* cited by examiner

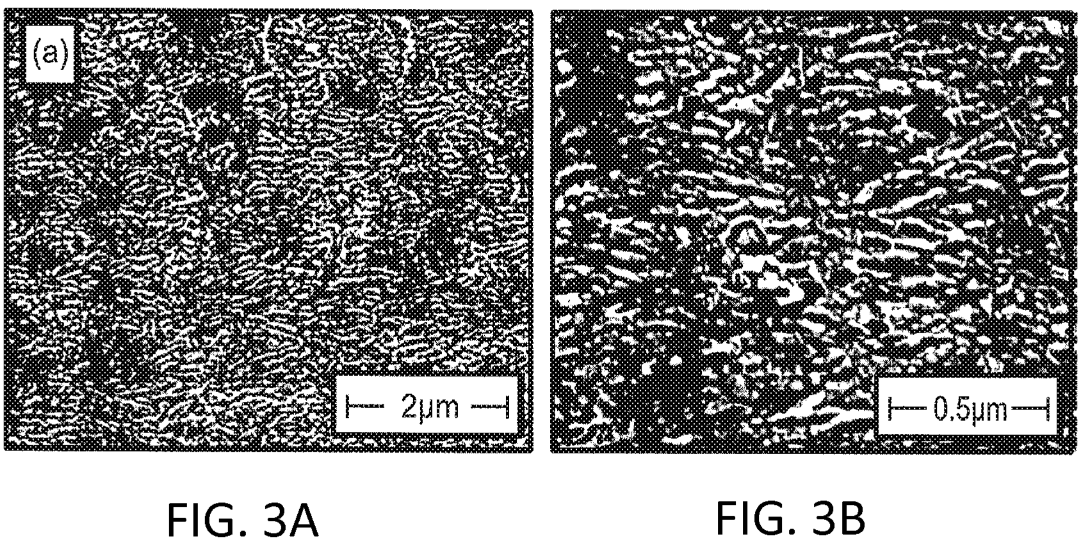
FIG. 3A
FIG. 3B
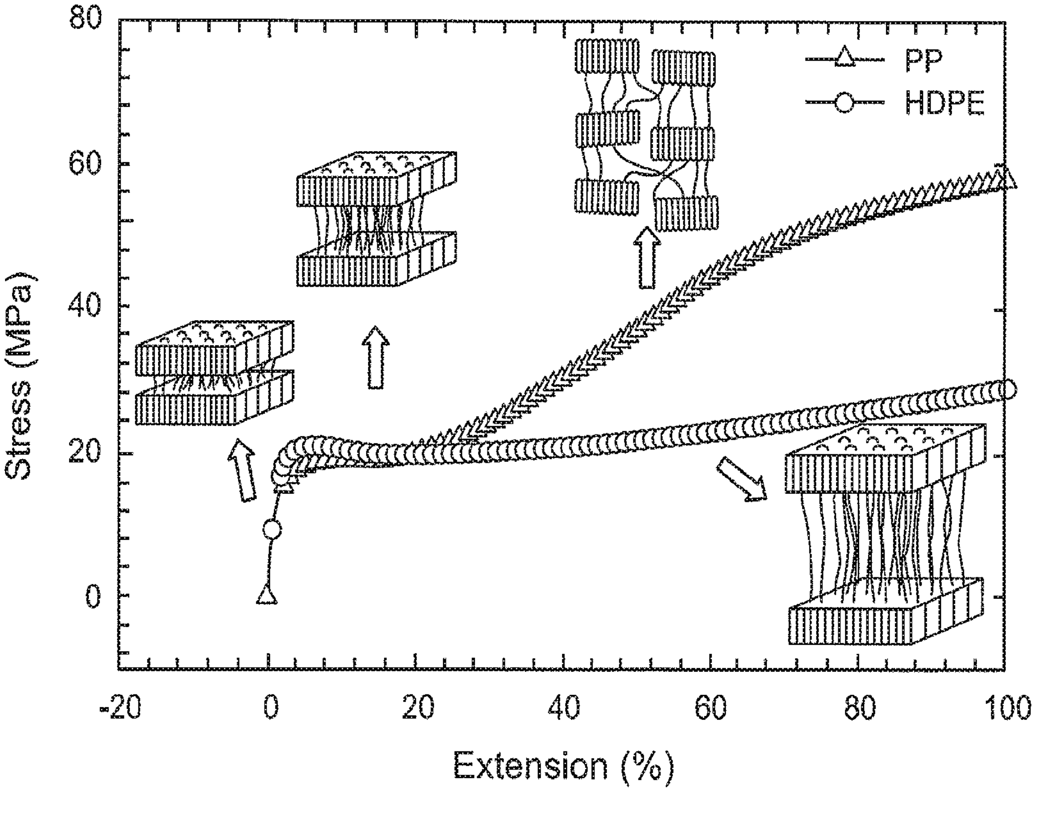
FIG. 4

MICROPOROUS MEMBRANE SEPARATORS FOR LITHIUM ION RECHARGEABLE BATTERIES AND RELATED METHODS

CROSS-REFERENCE TO RELATED APPLICATIONS

This application is a Divisional Application to U.S. application Ser. No. 14/950,478, filed Nov. 24, 2015, now U.S. Pat. No. 11,728,546, which claims priority to U.S. Provisional Application No. 62/084,628, filed Nov. 26, 2014, which is incorporated herein by reference in its entirety.

FIELD OF THE INVENTION

The present application is directed to one or more novel or improved porous membranes, base films or battery separators and/or various methods of making and/or using such membranes, films or separators. In accordance with at least selected embodiments, aspects or objects, the present application or invention is directed to one or more novel or improved microporous membrane battery separators, membrane base films or membrane separators for a lithium battery such as a secondary or rechargeable lithium battery, a lithium ion rechargeable battery, or the like, and/or various methods of making or using such separators and/or batteries. Certain particular inventive battery separators described herein may exhibit a thickness of less than about 14 μm and may exhibit increased strength performance, as defined by reduced splitting propensity or splittiness, when compared to known battery separators. The mode of splitting failure has been investigated, and the improvement in splitting propensity or splittiness may be quantified by a novel test method disclosed herein as Composite Splittiness Index (CSI). The novel or improved membranes, films or separators described herein may also exhibit improved Gurley as well as other improvements.

BACKGROUND OF THE INVENTION

A certain previous method for reducing splitting in microporous battery separator membranes, as well as particular split resistant or tear resistant microporous membranes, are known and discussed in U.S. Pat. No. 6,602,593. Such patent describes, among other things, a method that includes extruding a film precursor by a blown film method and using a blow-up ratio (BUR) of at least about 1.5 during blown film extrusion.

U.S. Pat. No. 8,795,565 describes, among other things, a biaxial stretching technique involving both MD and TD stretching of a dry process precursor membrane with a controlled MD relax process step. Biaxially stretched membranes, such as the membranes shown in FIGS. 1-3 of the U.S. Pat. No. 8,795,565 patent, may have some reduced splitting or tearing. When a biaxially stretched microporous membrane is strength tested using a puncture strength test method, the test sample puncture site may be a round hole as opposed to an elongated split.

U.S. Pat. No. 8,486,556 discloses, among other things, a multilayered battery separator membrane with increased strength as defined by mixed penetration strength test method which is a measure of the force required to create a short circuit through a separator membrane. A high molecular weight polypropylene resin having a certain melt flow index was used to produce the multilayered separators described in the U.S. Pat. No. 8,486,556 patent with thicknesses ranging up to about 25 μm, porosity ranging up to about 37%, an ASTM Gurley from 13-25 seconds, and an ionic resistance ranging up to about 2.5 ohms-cm$^2$.

Also known are wet process microporous battery separator membranes which are also typically biaxially stretched and which may have fairly balanced MD and TD strength properties. Examples of microporous membranes produced using a wet process may be disclosed in U.S. Pat. Nos. 5,051,183; 6,096,213; 6,153,133; and 6,666,969.

Wet process battery separator membranes may be manufactured using high molecular weight polymer resins which may have a molecular weight greater than 500,000, possibly greater than 1,000,000 and may use a plasticizer to allow for melt extrusion. Such a plasticizer, for example, one or more oils, may be used in order for the high molecular weight resins to undergo melt extrusion. The plasticizer may be extracted using one or more solvents as part of the manufacturing process. The oil/plasticizer-contaminated solvent from the extraction step of the manufacturing process may need to be recycled in order to bring the extracted solvent and oil to usable purity quality. This is an additional energy cost that may be expensive. Therefore, various wet processes of making battery separators may have a disadvantage of being environmentally challenged processes that may call for costly solvent handling and various disposal issues when compared to a solvent-free, "green", or low impact, dry process method of making battery separators (sometimes referred to as the Celgard dry process).

The various known methods, such as BUR blown film method, methods involving TD stretching of dry process membranes, and wet process biaxial stretching methods for porous membranes may not fully optimize a balance of strength or performance properties for a microporous separator or membrane separator, for a thin microporous separator or membrane separator, or the like.

Additionally, prior methods or products may not combine the strength or performance properties with the use of a solvent-free, environmentally low impact process to produce a microporous battery separator or membrane separator having excellent cycle performance and safety in a lithium battery, especially a high energy lithium ion battery.

Accordingly, there is a need for novel or improved porous membranes, base films or battery separators and/or methods of making and/or using such membranes, films or separators, dry process microporous battery separators or membrane separators with a thickness of less than about 14 μm, a relatively low Gurley number, relatively high porosity, and strength performance properties approaching or surpassing those of a wet process battery separator or membrane separator without the possible undesirable issues involved in various wet process manufacturing methods, for at least certain battery technologies or applications, for energy applications, and/or the like.

SUMMARY OF THE INVENTION

In accordance with at least selected embodiments, aspects or objects, the present invention may address one or more of the above needs and/or is directed to one or more novel or improved porous membranes, base films or battery separators and/or various methods of making and/or using such membranes, films or separators. In accordance with at least selected embodiments, aspects or objects, the present application or invention is directed to one or more novel or improved microporous membrane battery separators, membrane base films or membrane separators for a lithium battery such as a secondary or rechargeable lithium battery, a lithium ion rechargeable battery, or the like, and/or various methods of making or using such separators and/or batteries. Certain particular inventive battery separators described herein may exhibit a thickness of less than about 14 μm and may exhibit increased strength performance, as defined by reduced splitting propensity or splittiness, when compared to known battery separators. The mode of splitting failure has been investigated, and the improvement in splitting or splittiness may be quantified by a novel test method disclosed herein as Composite Splittiness Index (CSI). The novel or improved membranes, films or separators described herein may also exhibit improved Gurley as well as other improvements.

In accordance with at least selected embodiments, aspects or objects, the present invention addresses one or more of the above needs and is directed to one or more novel or improved porous membranes, base films or battery separators (or membrane separators) and/or various methods of making and/or using such membranes, films or separators. In accordance with at least selected embodiments, aspects or objects, the present invention is directed to one or more novel or improved microporous membrane battery separators, membrane base films or membrane separators (or membranes serving as at least one layer in a battery separator) for a lithium battery such as a lithium ion rechargeable battery and/or various methods of making or using such separators or films. Particular inventive battery separators described herein may exhibit a thickness of less than about 14 μm and may exhibit increased strength performance, as defined by reduced splitting or splittiness, when compared to known battery separators. The mode of splitting failure has been investigated, and the improvement in splitting or splittiness may be quantified by a novel test method disclosed herein as the Composite Splittiness Index (CSI). The novel or improved membranes, films or separators described herein may also exhibit improved Gurley as well as other improvements and may be especially adapted for energy applications.

The present application is directed to one or more novel or improved porous membranes, base films or battery separators and/or various methods of making and/or using such membranes, films or separators. In accordance with at least selected embodiments, aspects or objects, the present invention is directed to one or more novel or improved microporous membrane battery separators for a lithium battery such as a lithium ion rechargeable battery and various methods of making or using such separators. The possibly preferred battery separators described herein may exhibit a thickness of less than about 14 μm, less than about 13 μm, or less than about 8 μm, and may surprisingly exhibit increased strength performance, as defined by reduced splittiness, when compared to known battery separators of the same (or greater) thickness. The improvement in splitting or splittiness may quantified by a test method disclosed herein as Composite Splittiness Index (CSI) and the novel or improved separators described herein may have a CSI of between 29 and 139, and may also exhibit improved Gurley as well as other improvements.

The present invention relates in at least selected embodiments to a novel or improved microporous battery separator for a lithium ion rechargeable battery and/or related methods of making and/or using such a separator. A particular inventive dry process battery separator or membrane separator exhibits a thickness that is less than about 14 μm and has increased strength performance as defined by split resistance or reduced splittiness as quantified by a novel test method known as the Composite Splittiness Index (CSI).

A blow-up ratio method may involve a radial expansion of blown film from an annular die. An increased level of crystalline structure orientation in the transverse direction (TD) may be achieved in an extruded membrane using a blow-up ratio greater than about 1.5. Such an increased crystalline structure orientation in the TD achieved by the radial expansion of the blown extruded precursor film may further improve the TD tensile strength and TD elongation resulting in less splitting of the stretched microporous membrane.

A round puncture hole may be indicative of reduced splitting propensity or splittiness, enhanced split resistance, balanced TD and MD strength and good TD elongation of the membrane and therefore may be predictive of excellent strength performance when such a membrane is used as a battery separator, membrane separator, base film, or at least one layer in a battery separator in a lithium ion battery.

The various known methods, such as BUR blown film method, methods involving TD stretching of dry process membranes, and wet process biaxial stretching methods for porous membranes may not fully optimize a balance of the following strength or performance properties for a microporous separator or membrane with a thickness of less than about 14 μm:

Excellent MD and TD tensile strength;
Excellent TD elongation;
High puncture strength;
Desirable Gurley; and/or
Lack of splittiness.

Additionally, it may be desirable to combine the properties identified above with the use of a solvent-free, environmentally low impact process to produce a microporous battery separator membrane having excellent cycle performance and safety in a lithium battery such as a lithium-ion battery.

A novel or improved microporous battery separator has been developed for use in a lithium ion rechargeable battery. The inventive separator is preferably a dry process monolayer or multi-layer microporous battery separator membrane manufactured using a high molecular weight, low melt flow index polymer resin or a blend of high molecular weight, low melt flow index polymer resins, which, when extruded, do not require the use of plasticizers, and produce a precursor membrane with an internal microstructure having a relatively high level of crystalline lamellae orientation. This high level of crystalline lamellae orientation may provide for improved strength performance of the inventive separator compared with known separators. The degree of crystallinity in the lamellae structure of the nonporous precursor membrane may also affect the formation of the micropores during the stretching step in a dry process manufacturing of a microporous separator, base separator or base film (adapted to be coated on one or both sides or to be laminated to one or more other layers) or membrane (serving as at least one layer of a separator or base film).

Manufacturers of batteries for the consumer electronics industry may prefer thin microporous membrane battery separator or membrane separator with thicknesses preferably less than about 14 μm in order to optimize the energy density and improve the cycle life of a lithium ion secondary battery. The inventive battery separator or membrane is a "thin" battery separator or membrane with a thickness of less than about 14 μm as well as improved strength performance as defined by reduced splittiness, or reduced tearing as a result of puncture, when compared to other separators of the same thickness made by the same process such as a conventional dry stretch process.

The inventive separator or membrane of at least selected embodiments may achieve a leap frog improvement over prior battery separators or membranes because it provides for a thin, dry process separator or membrane having a thickness of less than about 14 μm which is characterized by reduced splittiness. The possibly preferred inventive separator membrane uses one or more high molecular weight, low melt flow index polymer resins or blends which, when extruded using a dry process preferably without the use of solvents and an extraction step, produces a much higher crystalline lamellae content in the precursor membrane (when compared to previously known precursor membranes). When the higher crystalline lamellae content precursor membrane is stretched to make pores, the resulting microporous membrane exhibits a reduction in the splittiness behavior, increased strength, higher porosity, lower electrical resistance and lower Gurley. The inventive dry process microporous battery separators or membranes produced using high molecular weight, low melt flow index (MFI) polymeric resins, may equal or surpass known wet process separator performance properties, may reduce or equalize the difference between dry process battery separator microporous membranes and wet process battery separator microporous membranes, and enhance or improve battery cycle life and safety performance in a lithium ion secondary battery.

The amount of crystallinity in the lamellae structure in the precursor membrane may affect the formation of the porous microstructure of a dry process stretched microporous membrane. It is mentioned in X. M. Zhang, et. al., "Oriented Structure and Anisotropy Properties of Polymer Blown Films HDPE, LLDPE and LDPE", POLYMER 45 (2004) 217-229 and in S. Tabatabaei, et. al, "Microporous Membranes Obtained from PP/HDPE Multilayer Films by Stretching", JMS 345 (2009) 148-159 that the structure of the crystalline phase strongly influences the mechanical properties of films. Tear resistance may be an important mechanical property for microporous membranes used in lithium ion batteries. A microporous membrane may need sufficient mechanical strength to resist splitting during the rigors of the winding and/or manufacturing step of a battery and such a membrane may need to withstand expansion and contraction forces which occur during repeated charge and discharge cycling through the lifetime of a battery.

Tear resistance of a microporous membrane is often described using the term "splittiness" where the splittiness can be measured in the MD or TD. A standard test method for measuring the mechanical strength of a membrane is known as the puncture strength test. FIG. 1 is a photograph of a membrane sample undergoing puncture strength testing with the membrane sample securely clamped in position and the test needle positioned to penetrate the test sample. Puncture strength testing measures the "load at break" where the compressive extension in mm is plotted as a function of load (in gram force).

Puncture strength test data enables a comparison of the mechanical strength performance of various porous membranes. In addition, this test method can be used to measure the resistance of a membrane against tearing or splitting upon the application of force. When a membrane test sample is puncture strength tested, the testing needle punctures the test sample leaving a mark or a hole at the site of penetration. In the investigation leading to the inventive membrane, it has been determined that the shape of the puncture hole provides a tool that can be used to evaluate a membrane's resistance to splittiness. A membrane sample which shows excellent resistance to splitting has been found to have a puncture hole which is round-shaped as shown in the FIG. 2A, whereas a membrane prone to splitting will tend to form an elongated split hole such as the holes shown in FIGS. 2B and 2C.

A battery separator membrane which splits during puncture strength testing may tend to split or break during the rigors of the battery winding step in manufacturing a lithium ion secondary battery and/or during use of such a battery. The force required to split a membrane may be of significance. A battery separator membrane which splits easily could lead to possible battery failure due to direct or indirect contact between electrodes of a battery and/or electrode particles penetrating through a separator causing an internal short circuit. Furthermore, a battery separator membrane which is observed to split during the puncture strength test could possibly mechanically fail in a battery and allow the anode and cathode to touch causing an internal short in a battery.

The splitting behavior has been measured for a series of membranes used as a battery separator in lithium ion batteries. The resulting data has been used to determine the mode of splittiness or the potential "splitting failure" of separators such as microporous membrane separators or base films in certain batteries by application of an inventive test method known as Composite Splittiness Index (CSI).

BRIEF DESCRIPTION OF THE DRAWINGS

FIG. 2A is an inventive membrane or separator and depicts substantially round-shaped holes and where

FIGS. 3A and 3B include scanning electron micrographs (SEMs) of the surface of an etched nonporous polypropylene membrane showing the uniform and orderly structure of the crystalline regions at two magnifications.

FIG. 4 is a stress strain plot showing the behavior of PP and HDPE during stretching.

DETAILED DESCRIPTION OF THE INVENTION

In accordance with at least certain embodiments, aspects or objects, a novel or improved microporous battery separator has been developed for use in a lithium battery, such as a lithium ion rechargeable battery. The inventive separator membrane is preferably a dry process monolayer or multi-layer microporous battery separator or membrane manufactured preferably using a high molecular weight and a low melt flow index polymer resin or a blend of high molecular weight and low melt flow index polymer resins which, when extruded (without the need for plasticizers which must be extracted later), produces a precursor membrane with an internal microstructure having a high level of crystalline lamellae orientation. This high level of crystalline lamellae orientation may lead to superior strength performance of the inventive separator or membrane. Manufacturers of batteries for the consumer electronics industry may prefer a thin microporous battery separator or membrane with a thickness of less than about 14 μm in order to optimize the energy density and lifetime of various lithium ion secondary batteries, especially energy batteries or cells. The inventive battery separator or membrane is preferably a "thin" membrane battery separator, base film or membrane with a thickness of less than about 14 μm with improved toughness and excellent strength performance as defined by reduced splittiness or tearing as a result of puncture, when compared to other separators of the same thickness made, for example, by a conventional dry stretch process. Such a microporous membrane and/or battery separator may be especially useful in various applications where high energy batteries are used.

The amount of crystalline lamellae structure in the precursor membrane may play a role in the formation of the micropores. FIG. 3 shows a surface SEM of the stacked lamellar structure of an etched nonporous polypropylene membrane which has not undergone MD or TD stretching. The etching process was performed in order to remove any amorphous portion which allows for better visualization of the crystalline lamellae structure. A commonly known mode of pore formation in membranes is known in the art and published in X. M. Zhang, et. al., "Oriented Structure and Anisotropy Properties of Polymer Blown Films HDPE, LLDPE and LDPE", POLYMER 45 (2004) 217-229 and in S. Tabatabaei, et. al, "Microporous Membranes Obtained from PP/HDPE Multilayer Films by Stretching", JMS 345 (2009) 148-159. FIG. 4 is a typical stress/strain plot showing the response of a nonporous membrane to applied stress where the pulling apart of the stacked crystalline lamellae plates with the initial application of stress is depicted. This initial separation of the lamellae plates is followed by the further pulling out of the polymer chains from the lamellae to form fibrils. Further extension of polymer fibrils is shown in FIG. 4 to form the walls of the pores.

Figure 5:
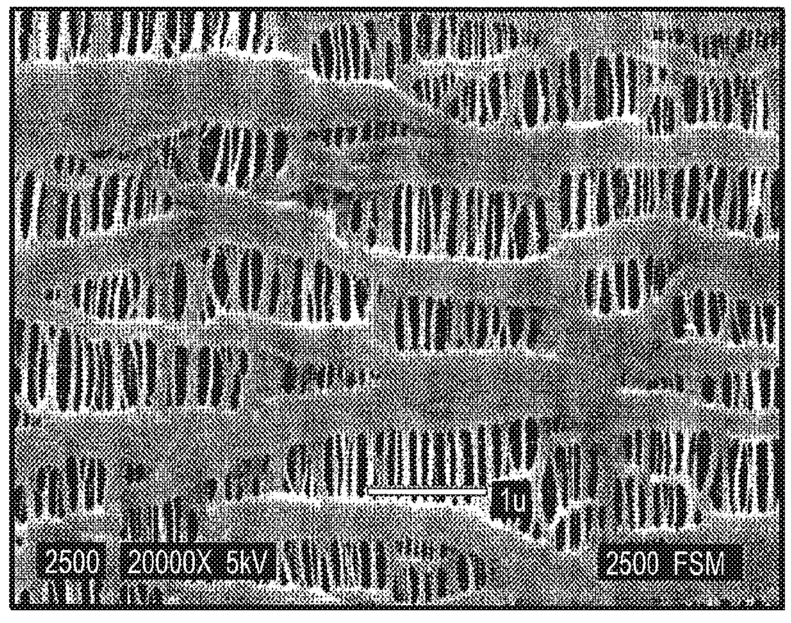
FIG. 5 is an SEM of the surface of a prior art microporous membrane, CE6, at 20,000× magnification.
Figure 6:
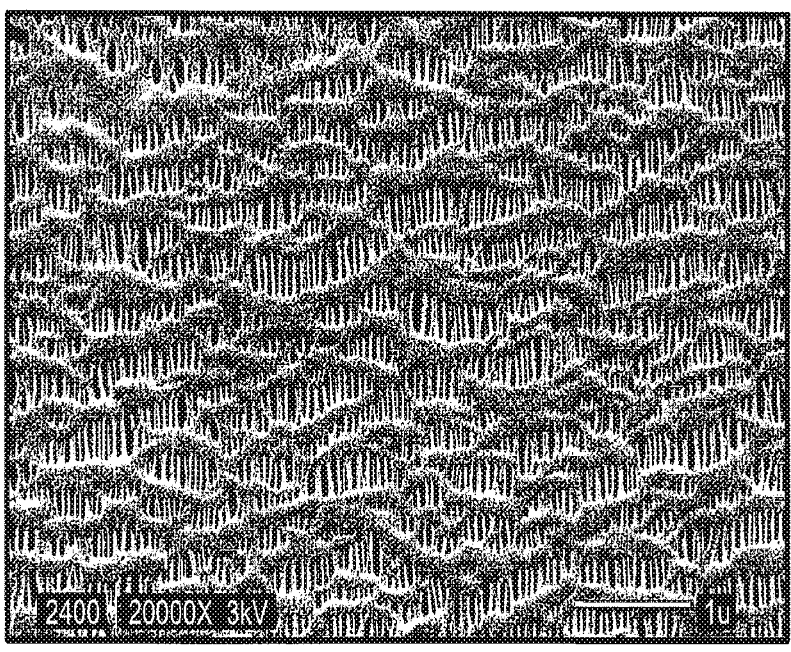
FIG. 6 is an SEM of the surface of a prior art microporous membrane, CE5, at 20,000× magnification.

FIGS. 5 and 6 are SEM images showing the microscale appearance of the surface of prior art polypropylene (PP) microporous membranes CE6 and CE5, respectively, where the crystalline lamellae and fibrillar structure are visible. A comparison of the crystalline lamellae regions of CE6 and CE5 membranes demonstrates that CE6 has thicker crystalline lamellae regions. In addition, the pore size of CE6 is approximately twice the size of the pores in CE5. CE6 and CE5 membranes are produced using polypropylene resins of different molecular weights with different melt flow indices (see Table 1) which may play a role in the amount of crystalline lamellae which forms during melt extrusion of the precursor membrane.

TABLE 1

| Membrane | MFI (melt flow index) of resins | Crystallinity (%) | Pore size (μm) |
|---|---|---|---|
| CE6 | 5.0 | 54.5% | 0.064 |
| CE5 | 1.5 | 47.5% | 0.04 |

The amount of crystallinity in the lamellae structure in the precursor membrane may be a factor in the formation of internal porous microstructure of a dry process stretched microporous membrane. It is mentioned that the structure of the crystalline phase may influence the mechanical properties of a film. (X. M. Zhang, et. al., "Oriented Structure and Anisotropy Properties of Polymer Blown Films HDPE, LLDPE and LDPE", POLYMER 45 (2004) 217-229).

The inventive separator membrane of at least selected embodiments can be prepared by the dry process or the dry stretch process (also known as the CELGARD® dry process) and the inventive membrane may be mono-layer or multi-layer. In the case of a multi-layer membrane or separator, the process may comprise: extruding PP and/or polyethylene (PE) nonporous precursors, bonding together the nonporous precursors in, for example, a PP/PE/PP stacked configuration to form a bonded nonporous PP/PE/PP precursor, and stretching such a precursor to form a microporous multilayer membrane where pore formation results from stretching a nonporous, semi-crystalline, extruded polymer precursor in the machine direction. Additional stretching (for example, in the TD) could take place as well.

An important mechanical property for microporous membranes used in lithium ion batteries is the tear resistance. A microporous membrane should have sufficient tear resistance so that it does not split or tear during the winding of a battery and should able to withstand expansion and contraction forces which occur during repeated charge and discharge cycling through the lifetime of a battery.

Figure 1:
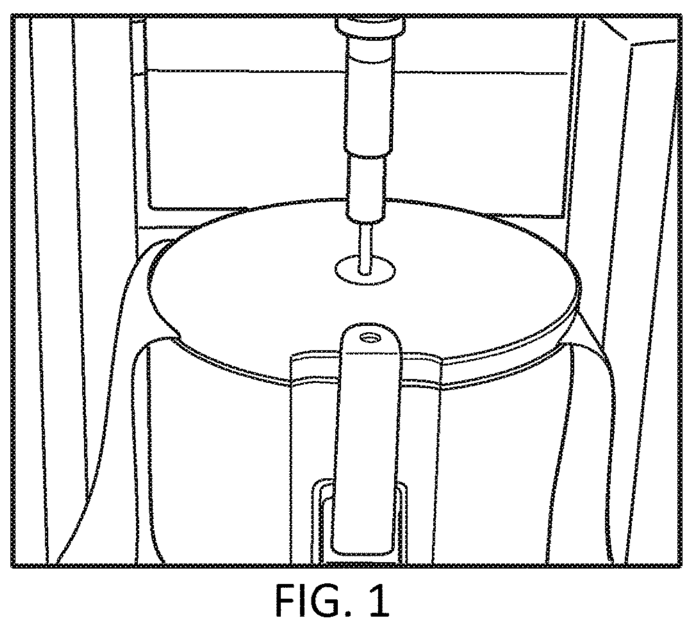
FIG. 1 is a photograph of a microporous membrane undergoing puncture strength testing.
Figure 8:
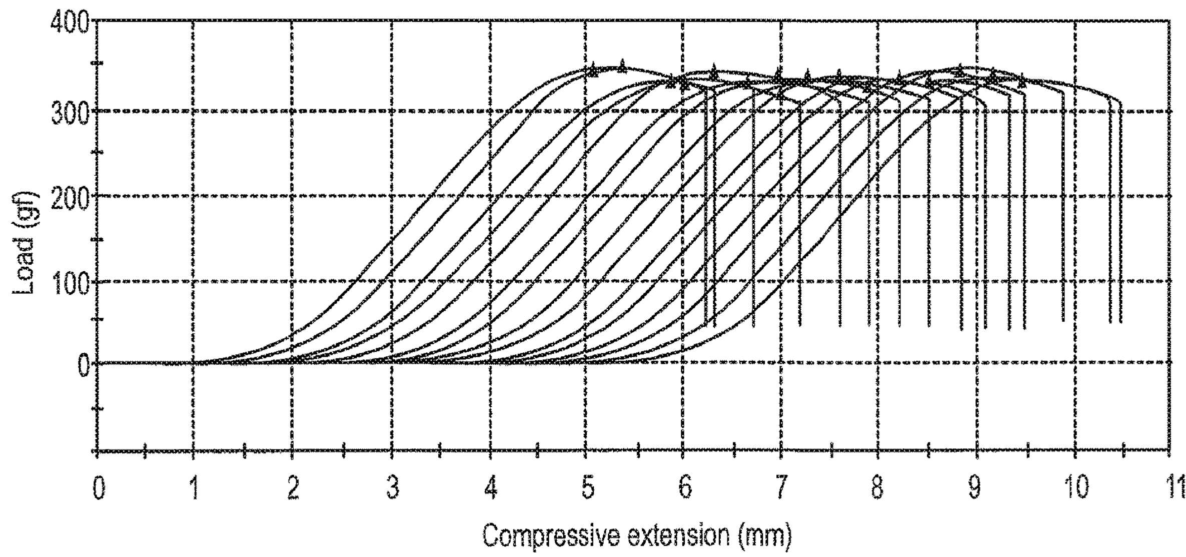
FIG. 8 is a single peak puncture strength test plot.

Tear resistance of a microporous membrane is often described using the term "splittiness" where the splittiness can be measured in the MD or TD. A standard test method for measuring the mechanical strength of a membrane is known as the Puncture Strength test. FIG. 1 shows a photograph of a membrane sample clamped in position in the puncture strength testing equipment setup with the test needle positioned to penetrate the test sample. Puncture strength testing measures compressive extension (displacement) in millimeters with the application of load (stress). FIG. 8 shows an example of a puncture strength plot where the "load at break" is determined as the maximum load at the point when a sample is punctured. Although fifteen positions on test sample were puncture tested in this example plot, typically 30 positions are tested and the maximum load at break is defined as the average. During this example, the applied load increased to approximately 350 gram force as the test membrane sample was downwardly displaced to approximately 6 mm at which point the sample punctured.

The observed linear relationship between the load applied and the resulting displacement of the test membrane produced a "single" peak plot.

Figure 9:
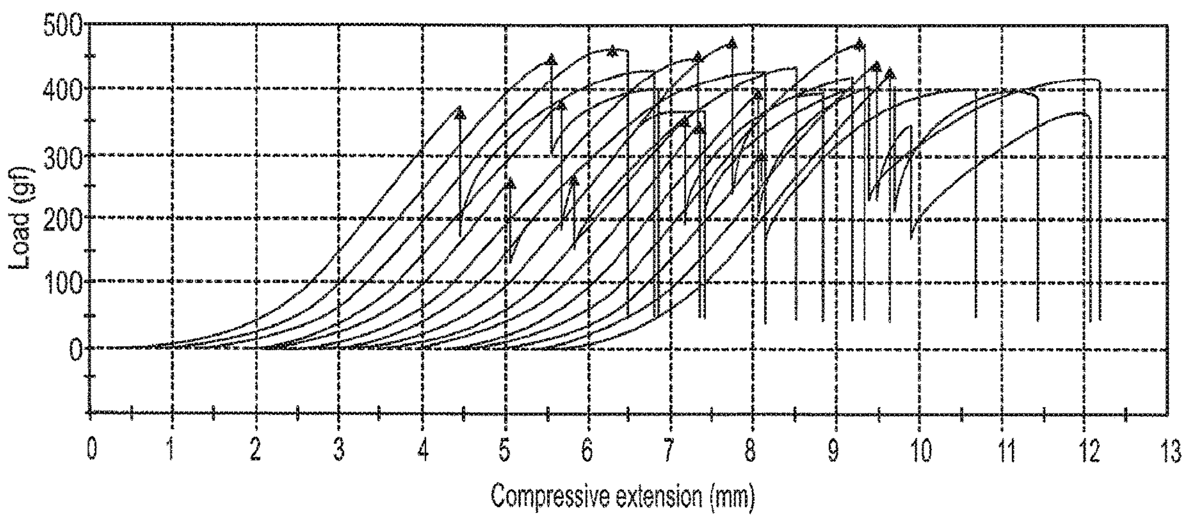
FIG. 9 is a double peak puncture strength test plot.

Puncture strength test data enables the comparison of strength performance of various porous membranes. FIG. 9 is an example of the inventive multilayer membrane separator or membrane where the test needle initially punctured one layer of the membrane and with the continued application of downward load, proceeded to fully penetrate the test sample producing a two peak plot. The initial puncture is defined as the "first load peak" while the second puncture is defined as the "second load peak."

Figure 2A:
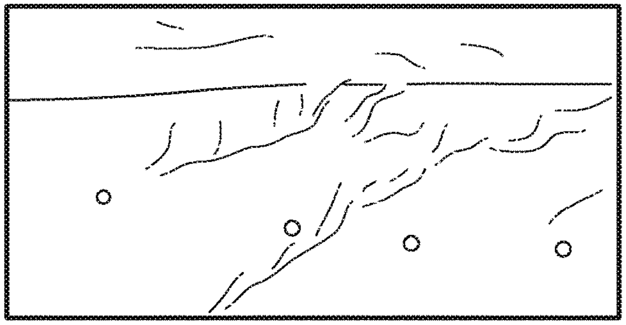
FIG. 2A includes three close-up optical photographs of different shaped holes produced as a result of puncture testing three different microporous membrane or separator test samples, where
Figure 2B:
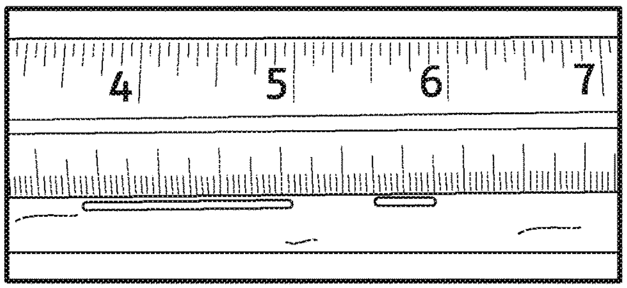
FIGS. 2B and 2C depict holes as elongated splits in comparative samples.
Figure 2C:
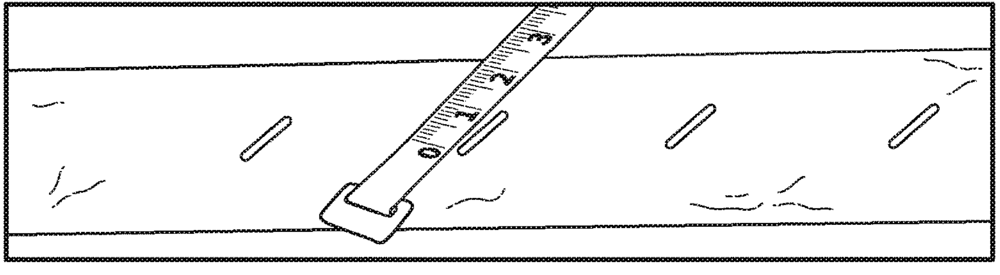

In addition to measuring the load to break, this test method can be used to assess the resistance of a membrane against tearing or splitting with the application of force. During puncture strength testing, the needle punctures the test sample leaving a puncture mark or a hole at the site of penetration. Not only is the load required to make the hole measured, but the shape of the puncture hole provides a tool that can be used to measure the comparative resistance to tearing or splitting or measuring the splittiness of a membrane. The length (or the diameter if the puncture hole shape is round) of the hole was measured using a ruler to the nearest millimeter for commercial microporous membranes and for various membranes according to the present invention. A membrane sample that shows excellent resistance to splitting has been found to have a hole which is round-shaped such as that shown in the FIG. 2A. In contrast, FIG. 2B shows a membrane which split linearly 3.5 cm in length in one test and 9 mm in a repeat test a result of puncture strength testing. A membrane which splits and fails mechanically in this fashion is more likely to split during the rigors of the battery winding step in manufacturing a battery and/or to fail to keep the anode and cathode electrodes from coming into contact during battery use resulting in an internal short in at least certain batteries or applications.

The mechanical strength of porous membranes is also commonly evaluated by measuring tensile strength in the machine direction (MD) and transverse direction (TD). Machine direction is defined as the longitudinal direction at the time of sheet production while transverse direction is defined as the width direction at the time of sheet production. In addition, the distance a membrane will stretch from its original size to the point at which it breaks, defined as the % elongation, may be important in assessing the amount of distortion a membrane will undergo without destruction. Percent elongation can be measured in MD and TD.

Mechanical strength test data has been used to investigate the mode of splittiness or "splitting failure" propensity. An inventive test method known as Composite Splittiness Index (CSI) has been developed where CSI value is defined by Equation 1 (noted below) where CSI is a function of the first load peak, the second load peak, TD tensile strength, MD tensile strength, and TD elongation measured during puncture strength testing.

$$CSI = \left(A - |B - A|^{1.8}\right) \times C \times (D \times E) / 10^6 \qquad \text{Equation 1}$$

where:

A=First Load Peak/Thickness×(1−% Porosity)

B=Second Load Peak/Thickness

C=TD Elongation

D=MD Tensile Strength

E=TD Tensile Strength where First and Second Load Peak are in units of gram-force, thickness values are in microns, MD and TD tensile strength are in gram-force, and TD elongation is expressed as percentage. A high CSI value is predictive of a microporous membrane that may have excellent strength performance in a lithium ion battery, both during the battery cell winding step in the manufacturing process and during expansion and contraction of the membrane which can occur during repeat charge and discharge cycles throughout the lifetime of the battery.

Examples

Various microporous membranes or separators were made according to the present invention. In particular, Examples 1 through 5 were produced either as monolayer PP membranes or trilayer (PP/PE/PP) membranes and made using various low MFI (melt flow index) polypropylene resins. Some of the examples (as noted in Table 2) included a blend of polypropylene resins having slightly different (low) MFI values.

Table 2 below lists resin and membrane properties of inventive membranes Example 1 to Example 5. In addition, Comparative Examples CE1 to CE6 are provided to enable a comparison of the inventive membranes and prior membranes.

TABLE 2

| | Example | mfi PP | PP Homopolymer or PP Blend | Description | Thickness | % Porosity | PP Pore Size μm | JIS Gurley | ER ohm − cm² | Hole size mm (Splittiness) | PS/μm gf/μm |
|---|---|---|---|---|---|---|---|---|---|---|---|
| Less than 13.5 μm | Ex1 | 0.5 | Homopolymer | Mono PP | 7 | 31% | 0.04 | 200 | 0.8 | 6.0 | 18.7 |
| | Ex2 | 0.3 | Homopolymer | Mono PP | 7 | 36% | 0.04 | 210 | 0.9 | 3.5 | 29.6 |
| | Ex3 | 0.5, 0.45 | Blend | Mono PP | 7 | 41% | 0.04 | | | 4.5 | 21.3 |
| | Ex4 | 0.8, 0.3 | Blend | Trilayer | 12 | 44% | 0.031 | 230 | 1.2 | 2.0 | 23.2 |
| | Ex5 | 0.3 | Homopolymer | Trilayer | 13.5 | 40% | 0.026 | 400 | 1.5 | 2.0 | 29 |
| Greater than or equal to 16 μm | CE1 | na | na | Mono PP | 16 | 41% | 0.05 | 335 | 1.5 | 2.0 | 13.6 |
| | CE2 | na | na | Trilayer | 16.7 | 41% | 0.03 | 316 | 1.5 | 14.3 | 19.5 |
| | CE3 | 0.9 | Homopolymer | Trilayer | 16 | 35% | 0.032 | 460 | 1.8 | 5.2 | 15.6 |
| | CE4 | 1.5 | Homopolymer | Trilayer | 25 | 39% | 0.028 | 620 | 2.5 | 4.7 | 15.2 |
| | CE5 | 1.5 | Homopolymer | Mono PP | 25 | 41% | 0.043 | 620 | 2.3 | 2.0 | 26.3 |
| | CE6 | 5 | Homopolymer | Mono PP | 25 | 55% | 0.064 | 200 | 1.1 | 1.9 | 26.4 |

| 1st Load Peak | 2nd Load Peak | 2nd Load Peak − 1st Load |
|---|---|---|

TABLE 2-continued

| | Example | gf | A | gf | B | Peak, gf | E | D | C | CSI |
|---|---|---|---|---|---|---|---|---|---|---|
| Less | Ex1 | 131 | 27.28 | 120 | 24.99 | −11 | 153 | 1813 | 464% | 29 |
| than | Ex2 | 198 | 44.27 | 198 | 44.27 | 0 | 207 | 2708 | 557% | 138 |
| 13.5 μm | Ex3 | 146 | 35.35 | 141 | 34.14 | −5 | 190 | 1882 | 473% | 57 |
| | Ex4 | 279 | 41.58 | 277 | 41.15 | −3 | 136 | 2245 | 700% | 88 |
| | Ex5 | 392 | 48.40 | 391 | 48.27 | −1 | 150 | 2500 | 780% | 141 |
| Greater | CE1 | 274.7 | 29.07 | 275 | 29.10 | 0 | 160 | 1427 | 243% | 16 |
| than | CE2 | 217 | 22 | 319 | 32.38 | 102 | 155 | 1941 | 740% | −100 |
| or | CE3 | 325 | 31.3 | 305 | 29.33 | 20 | 160 | 1700 | 87% | 6.6 |
| equal | CE4 | 445 | 25 | 451 | 29.57 | −6 | 150 | 1700 | 400% | 30 |
| to | CE5 | 417 | 26.1 | 417 | 26.1 | 0 | 140 | 1420 | 250% | 13.1 |
| 16 μm | CE6 | 330 | 26.4 | 330 | 26.4 | 0 | 135 | 1055 | 636% | 30 |

A = First Load Peak/Thickness × (1 − % Porosity)
B = Second Load Peak/Thickness
C = TD Elongation
D = MD Tensile Strength
E = TD Tensile Strength Ex. 1 to Ex. 3 are monolayer PP microporous membranes while Ex. 4 and Ex. 5 are examples of trilayer PP/PE/PP microporous membranes. The inventive membranes have thicknesses ≤about 13.5 μm while the Comparative Membranes have higher thickness values ranging from about 16 μm to about 25 μm, and where CE4 to CE6 are more than 3× thicker than Exs. 1-3. The inventive battery separator examples Ex. 1, 2 and 3 are more than 46% thinner than the comparative prior art examples, at comparative levels of % porosities, and demonstrate a remarkable increase in mechanical strength as defined by the CSI number. The CSI number is calculated using Equation 1 and is a function of thickness, % porosity, puncture strength, TD elongation, and MD and TD tensile strength.

The inventive monolayer membranes Ex. 1 to Ex. 3 which are each about 7 μm thick, are extremely thin battery separators or membranes. For example, inventive PP monolayer membrane Ex. 2 has a CSI value of 138 at a 7 μm thickness. The comparative PP monolayer example CE1 with a 16 μm thickness (more than twice the thickness of Ex. 1 thru Ex. 3) has a much lower CSI value of only 16. Furthermore, inventive trilayer membrane Ex. 5 has a CSI value of 141 at a 13.5 μm thickness. The outer PP layers in trilayer Ex. 5 were produced using a PP resin with an MFI value of 0.3 g/10 minutes demonstrating the benefits that a low MFI, higher molecular weight, PP resin can contribute to the CSI value of a porous separator membrane. The comparative prior art trilayer CE2 with a thickness of 16.7 μm has a much lower CSI value of −100 which predicts this separator may have poor strength performance during the battery cell winding step in the manufacturing process and during expansion and contraction of the membrane which can occur during repeat charge and discharge cycles throughout the lifetime of the battery for certain batteries as compared to the inventive separators. A membrane which has a low CSI value may split, fail mechanically in keeping the anode and cathode electrodes from coming into contact resulting in an internal short in a battery for certain batteries.

Figure 7:
FIG. 7 is a plot of the shear viscosity of selected resins and membranes according to various examples and comparative examples described herein.
Figure 7:
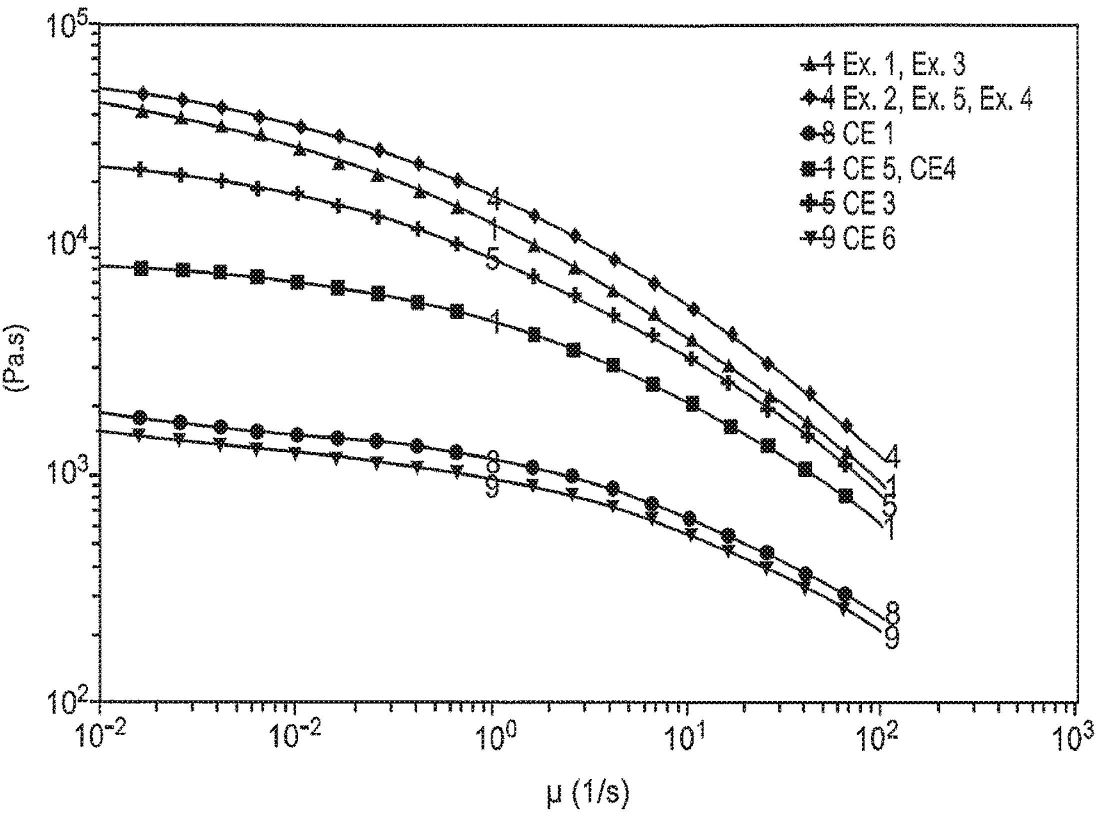

The inventive membranes may have a higher level of crystalline lamellae because they are produced using one or more low melt flow index (MFI), higher shear viscosity, high molecular weight polypropylene polymer resins. FIG. 7 shows the shear viscosity of inventive examples compared to the comparative examples. Examples 1-5 membranes have higher shear viscosity curves when compared to CE 1, 3, 4, 5 and 6. The higher shear viscosity values are a direct result of the lower MFI, higher molecular weight PP resin used to produce inventive examples.

Figure 10:
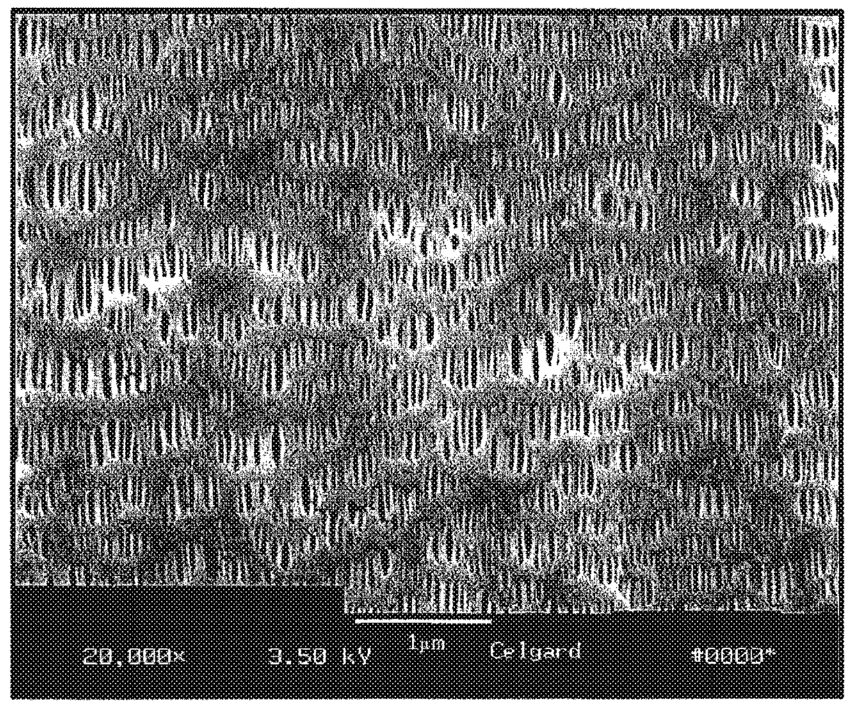
FIG. 10 is an SEM of the surface of an exemplary inventive membrane or separator Example 5.
Figure 11:
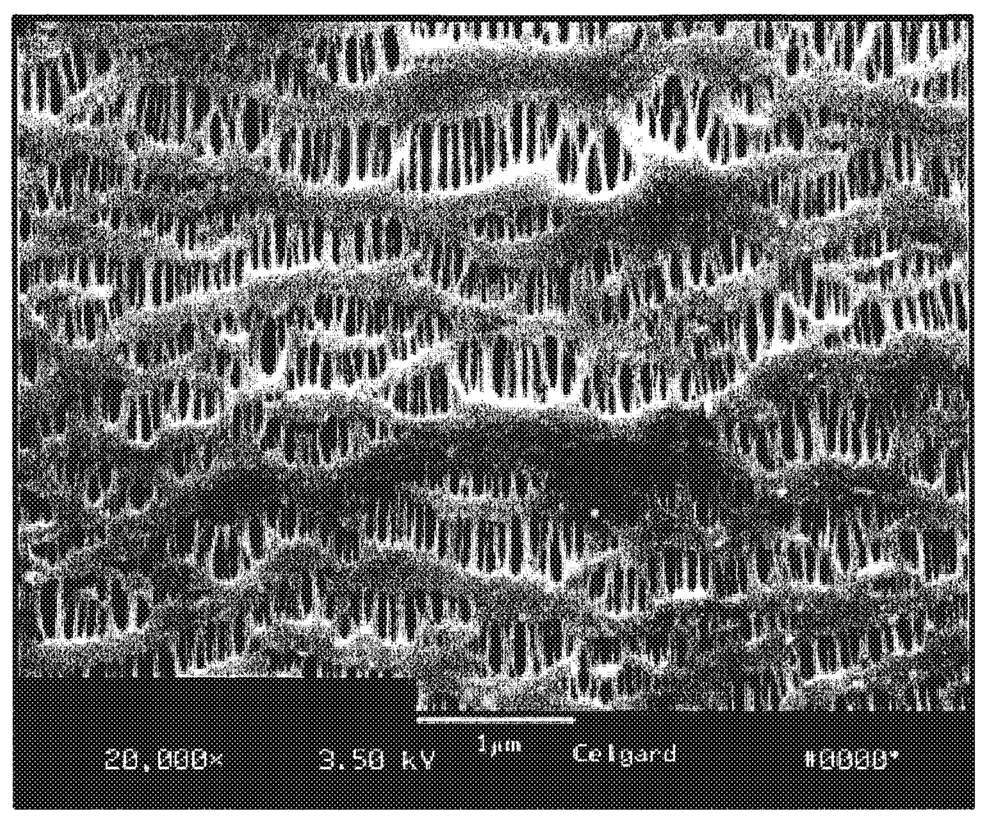
FIG. 11 is an SEM of the surface of prior art membrane Comparative Example 1.

A comparison of the SEMs in the CE6 membrane shown in FIG. 5 to the inventive membrane Ex. 5 shown in FIG. 10 demonstrates the more prevalent, uniform thickness regions of crystalline lamellae layers and the higher uniformity of these crystalline lamellae regions in the inventive membrane Ex. 5 compared to CE6. Note also the smaller pore size in the inventive membrane. FIG. 11 is an SEM of the surface of another comparative example, CE1, showing the lower amounts of crystalline lamellae and larger pores as compared to the inventive membrane in FIG. 10. The high level of crystalline lamellae orientation in the inventive membranes may play a role in the improved strength performance of the inventive porous membrane and/or separator. In addition, the uniformity of the highly crystalline lamellae structure of the nonporous precursor membrane may play a role in the improved strength performance of the inventive porous membrane and/or separator. Furthermore, both the high level of crystalline lamellae orientation and the uniformity of the highly crystalline lamellae structure of the nonporous precursor membrane may play a role in the formation of the micropores during the stretching step. When the higher, more uniform crystalline lamellae precursor membrane is stretched to make pores, the resulting microporous membrane exhibits a reduction in the splittiness behavior and a higher CSI value.

Figure 12:
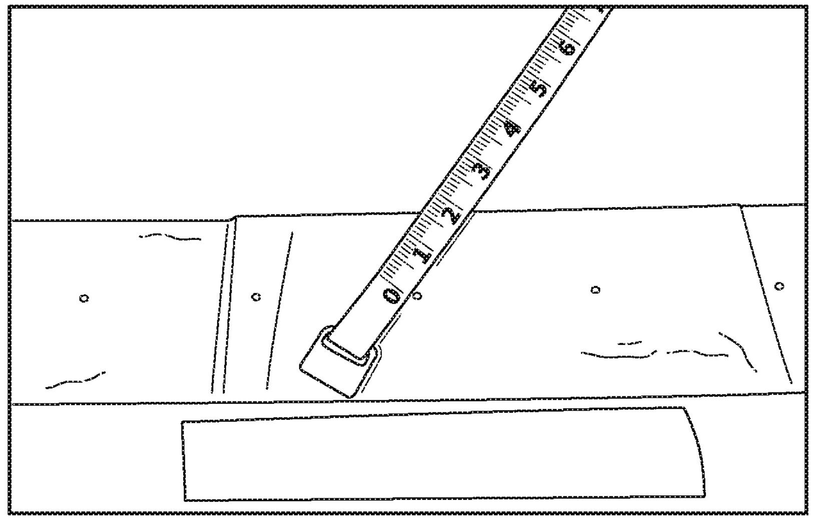
FIG. 12 is a photograph of Inventive Ex. 5, showing a puncture hole with a substantially round shape.
Figure 13:
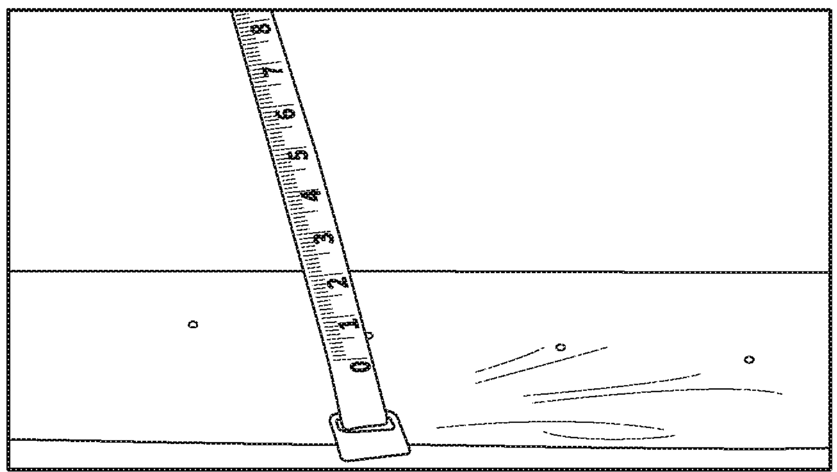
FIG. 13 is a photograph of Inventive Ex. 1, showing a puncture hole with a substantially round shape.
Figure 14:
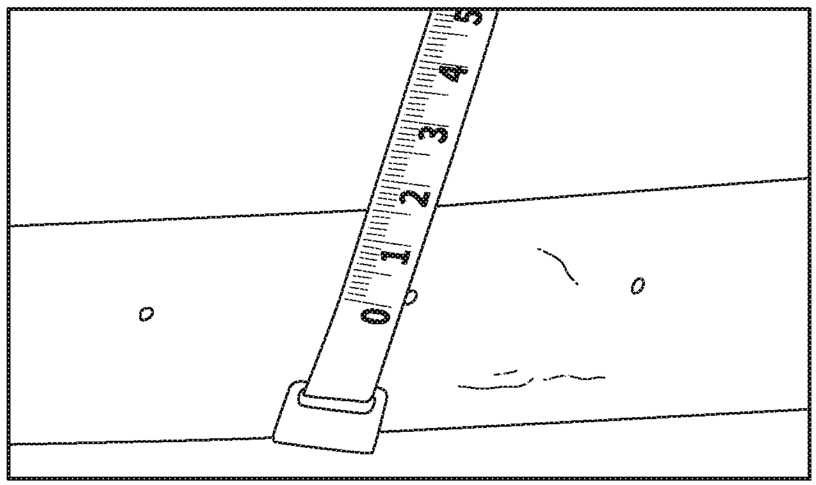
FIG. 14 is a photograph of Inventive Ex. 2, showing a puncture hole with a substantially round shape.
Figure 15:
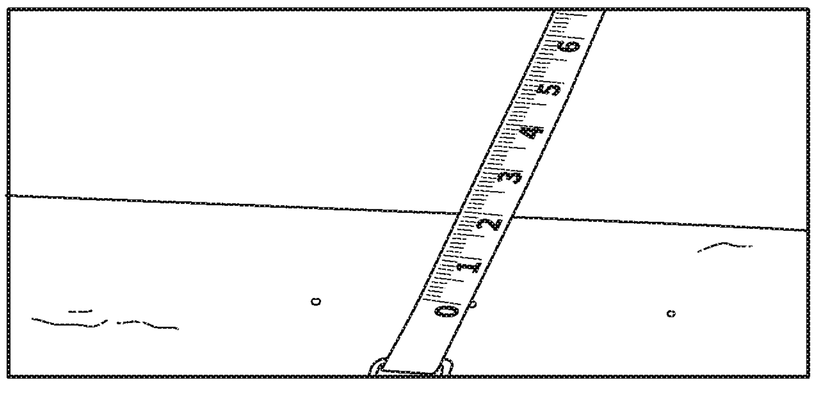
FIG. 15 is a photograph of Inventive Ex. 3, showing a puncture hole with a substantially round shape.
Figure 16:
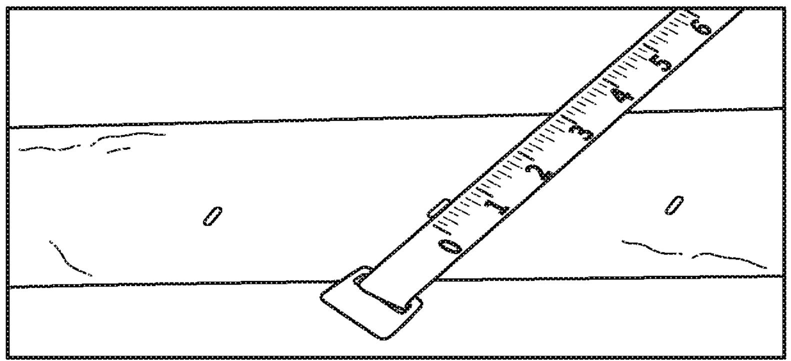
FIG. 16 is a photograph of a prior art membrane, CE4, showing a puncture hole with an elongated and/or slit-shaped hole.
Figure 17:
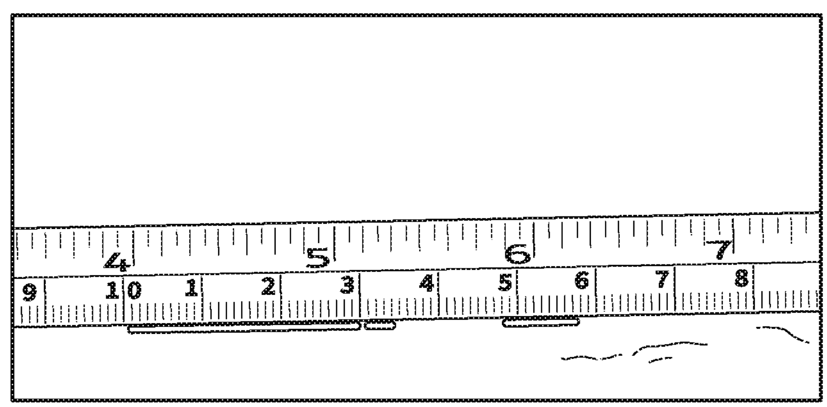
FIG. 17 is a photograph of a prior art membrane, CE2, showing a puncture hole with an elongated and/or slit-shaped hole.
Figure 18:
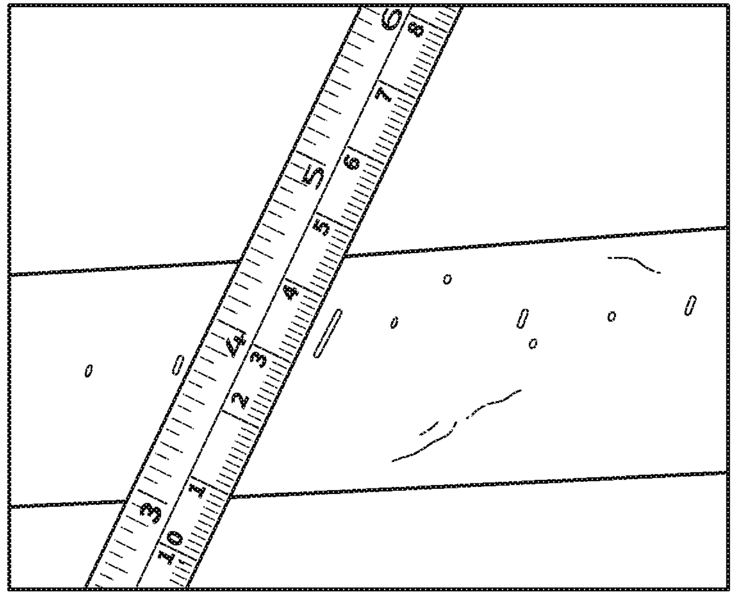
FIG. 18 is a photograph of a prior art membrane, CE1, showing a puncture hole with an elongated and/or slit-shaped hole.

In the investigation of the mode of splittiness, puncture strength testing shows that the inventive membranes have a different shaped puncture hole than the comparative membranes. The inventive membranes have a round shaped puncture hole while the comparative prior art membranes may tend to split and have an elongated and/or slit-shaped hole. The shape of the hole at the puncture site during puncture strength testing provides insight into the mode of splitting failure. FIG. 12 shows the round shape of the hole at the puncture site of Ex. 5 after puncture strength testing. Inventive membranes Ex. 1, Ex. 2, and Ex. 3, shown in FIGS. 13, 14, and 15, also have round shaped holes at the puncture site after puncture strength testing. In contrast, comparative examples CE4, CE2, and CE1, shown in FIGS. 16, 17, and 18 respectively, have elongated and/or slit-shaped holes indicating a mechanically weaker membrane that likely would split during the rigors of the winding manufacturing step of a battery and/or during use for certain batteries. In addition, membranes which demonstrate this tendency to split during the puncture strength testing likely would not withstand expansion and contraction forces which occur during repeated charge and discharge cycling through the lifetime of a lithium ion battery for certain batteries.

Splittiness or tear resistance may be an important requirement in mechanical performance for microporous membranes in rechargeable lithium ion batteries, especially high energy batteries or cells.

Figure 19:
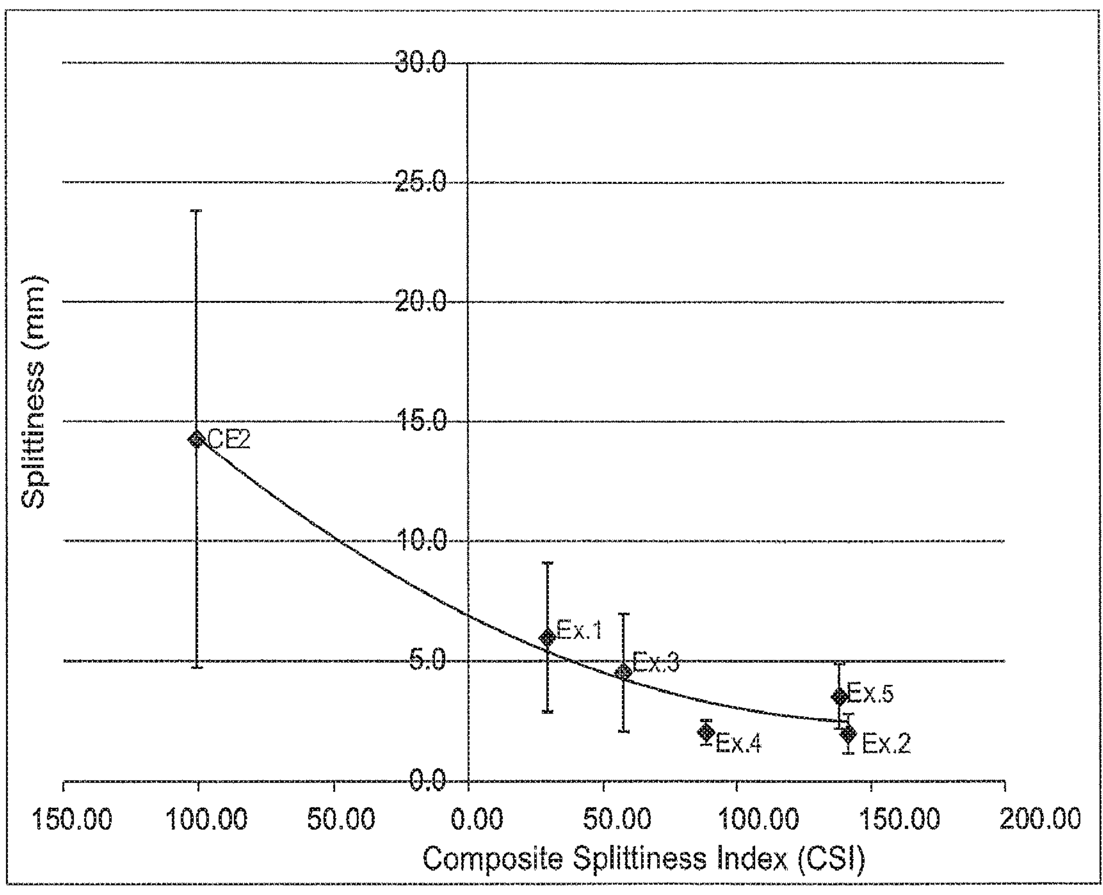
FIG. 19 shows a Composite Splittiness Index (CSI) plot of inventive and prior art membranes.

FIG. 19 is a plot of the Composite Splittiness Index (CSI), calculated using Equation 1, plotted against the slit length of a hole in millimeters measured from puncture strength test samples. The inventive membranes Ex. 1, Ex. 2, Ex. 3, Ex. 4 and Ex. 5 have higher CSI values and smaller puncture hole size (splittiness) than comparative example CE2, which is indicative of the excellent mechanical strength performance of the inventive membrane and demonstrates that the selection of the higher molecular weight low melt flow index PP resins provides a novel pathway to tailor the mechanical properties of a microporous membrane for a lithium ion battery.

Test Methods

Thickness

Thickness is measured using the Emveco Microgage 210-A precision micrometer thickness tester according to test procedure ASTM D374. Thickness values are reported in units of micrometers, μm.

Puncture Strength

Test samples are first pre-conditioned to 73.4 deg C. and a relative humidity of 50% for a minimum of 20 minutes. An Instron Model 4442 is used to measure puncture strength of test sample. Thirty measurements are made across the diagonal direction of a 1¼ "×40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

Splittiness

The splittiness of a test sample is measured using a ruler (marked in increments to the nearest mm) to measure the length of the hole (or slit) produced as a result of the penetration or piercing of the test sample by the needle during the Puncture Strength test. Splittiness is expressed in millimeters (mm) and is noted as "hole size" in Table 2 above.

Pore Size

Pore size is measured using the Aquapore available through Porous Materials, Inc. (PMI). Pore size is expressed in μm.

Porosity

The porosity of a microporous film sample is measured using ASTM method D-2873 and is defined as the percent void spaces in a microporous membrane.

TD and MD Tensile Strength

The tensile strength along the MD and TD is measured using Instron Model 4201 according to ASTM D-882 method.

Melt Flow Index (MFI)

Melt flow index of a polymer resin is measured using ASTM DS 1238; for measuring MFI of Polyethylene: Temperature=190° C. using weight 2.16 kg; for Polypropylene: Temperature=230° C. using weight 2.16 kg. MFI is measured as grams/10 minutes.

Electrical Resistance (ER) (also known as Ionic Resistance, IR)

Electrical Resistance is defined as the Resistance value in ohm-$cm^2$ of a separator filled with electrolyte. The units of electrical resistance are ohm-$cm^2$. The separator resistance is characterized by cutting small pieces of separators from the finished material and then placing them between two blocking electrodes. The separators are saturated with the battery electrolyte with 1.0 M $LiPF_6$ salt in EC/EMC solvent of 3:7 ratio by volume. The Resistance, R, in Ohms (a), of the separator is measured by a 4-probe AC impedance technique. In order to reduce the measurement error on the electrode/separator interface, multiple measurements are needed by adding more layers. Based on the multiple layer measurements, the electric (ionic) resistance, $R_s$ (Ω), of the separator saturated with electrolyte is then calculated by the formula $R_s=p_s 1/A$ where $p_s$ is the ionic resistivity of the separator in a-cm, A is the electrode area in $cm^2$ and 1 is the thickness of the separator in cm. The ratio $p_s/A$=is the slope calculated for the variation of the separator resistance (ΔR) with multiple layers (Δδ) which is given by slope=$p_s/A=\Delta R/\Delta\delta$.

Gurley

Gurley is defined by the Japanese Industrial Standard (JIS) and is measured using the OHKEN permeability tester. JIS gurley is defined as the time in seconds required for 100 cc of air to pass through one square inch of film at a constant pressure of 4.9 inches of water.

In accordance with at least selected embodiments, aspects or objects, there are provided one or more novel or improved porous membranes, base films or battery separators and/or various methods of making and/or using such membranes, films or separators. In accordance with at least certain embodiments, aspects or objects, the present invention is directed to one or more novel or improved microporous membrane battery separators for a lithium battery such as a lithium ion rechargeable battery and various methods of making or using such separators. The battery separators described herein may exhibit a thickness of less than about 14 μm and may exhibit increased strength performance, as defined by reduced splittiness, when compared to known battery separators. The mode of splitting failure has been investigated, and the improvement in splittiness may be quantified by a test method disclosed herein as Composite Splittiness Index (CSI). The novel or improved separators described herein may also exhibit improved Gurley as well as other improvements.

The present invention relates in at least selected embodiments to a novel or improved microporous battery separator for a lithium ion rechargeable battery and/or related methods of making and/or using such a separator. A particular inventive dry process battery separator or membrane separator exhibits a thickness that is less than about 14 μm and has increased strength performance as defined by reduced splittiness. The mode of splitting failure has been investigated, and the improvement in splittiness quantified by a novel test method known as Composite Splittiness Index (CSI).

Preferred embodiments include inventive robust Celgard® brand battery separators designed to meet the needs of battery and cell manufacturers and offer excellent energy and/or power performance, dimensional integrity, and chemical and thermal stability in lithium battery applications.

The present invention may be directed to one or more novel or improved porous membranes, base films or battery separators and/or various methods of making and/or using such membranes, films or separators. In accordance with at least selected embodiments, aspects or objects, the present application or invention is directed to one or more novel or improved microporous membrane battery separators, membrane base films or membrane separators for a lithium battery such as a secondary or rechargeable lithium battery, a lithium ion rechargeable battery, or the like, and/or various methods of making or using such separators and/or batteries. Certain particular inventive battery separators described herein may exhibit a thickness of less than about 14 μm and may exhibit increased strength performance, as defined by reduced splitting or splittiness, when compared to known battery separators. The mode of splitting failure has been investigated, and the improvement in splitting or splittiness may be quantified by a novel test method disclosed herein as Composite Splittiness Index (CSI). The novel or improved membranes, films or separators described herein may also exhibit improved Gurley as well as other improvements.

The present invention relates in at least selected embodiments to a novel or improved microporous battery separators for lithium ion rechargeable batteries and/or related methods of making and/or using such separators. A particular inventive dry process battery separator or membrane separator exhibits a thickness that is less than about 14 μm and has increased strength performance as defined by reduced splittiness. The mode of splitting failure has been investigated, and the improvement in splittiness quantified by a novel test method known as Composite Splittiness Index (CSI).

At least selected embodiments may relate to improved base films or battery separators and/or methods of making and/or using such membranes, films or separators, dry process microporous battery separators or membrane separators with a thickness of less than about 14 μm, a relatively low Gurley number, relatively high porosity, and strength performance properties approaching or surpassing those of a wet process battery separator or membrane separator without the possible undesirable issues involved in various wet process manufacturing methods, for at least certain battery technologies or applications, for energy applications, and/or the like.

The present invention may be embodied in other forms without departing from the spirit and the essential attributes thereof, and, accordingly, reference should be made to the appended claims, rather than to the foregoing specification, as indicating the scope of the invention. Additionally, the invention disclosed herein suitably may be practiced in the absence of any element which is not specifically disclosed herein.

We claim:

1. A separator comprising:

at least one microporous membrane being produced according to a dry stretch process in which a polyolefin resin mix containing polyolefin resin or blend containing the polyolefin resin is extruded to form said at least one microporous membrane, said polyolefin resin having a melt flow index (MFI) of less than or equal to 0.8 grams/10 minutes; and said separator having a total thickness of 7 μm, a puncture strength first load peak of 131 to 198 gf, and an electrical resistance (ER) value of less than or equal to 1.5 ohm-cm$^2$.

2. The separator of claim 1, wherein the separator has a porosity of 31% to 41%.

3. The separator of claim 1, wherein said at least one microporous membrane is comprised of polypropylene.

4. The separator of claim 1, wherein the separator comprises a monolayer film.

5. The separator of claim 1, wherein the separator comprises a bilayer film.

6. The separator of claim 1, wherein the separator comprises a trilayer film.

7. The separator of claim 1, wherein the separator comprises a multilayer film.

8. A microporous polyolefin membrane comprising:

at least one microporous membrane being produced according to a dry stretch process in which a polyolefin resin mix containing polyolefin resin or blend containing the polyolefin resin is extruded to form said at least one microporous membrane, said polyolefin resin having a melt flow index (MFI) of less than or equal to 0.8 grams/10 minutes; and said microporous membrane having a total thickness of 7 μm, a puncture strength first load peak of 131 to 198 gf, and an electrical resistance (ER) value of less than or equal to 1.5 ohm-cm$^2$.

9. The microporous polyolefin membrane of claim 8, wherein said microporous membrane has a porosity of 31% to 41%.

10. The microporous membrane of claim 8, wherein said microporous membrane is comprised of polypropylene.

* * * * *